July 9, 1968
F. S. BRILES
3,391,449
METHOD OF MAKING A PRESTRESSED RIVETED CONNECTION
Filed Jan. 17, 1966
2 Sheets-Sheet 1
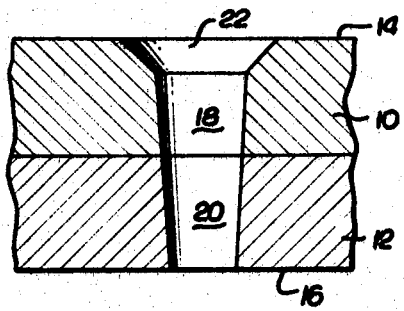
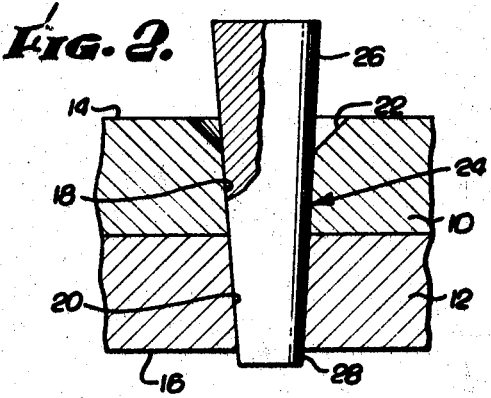
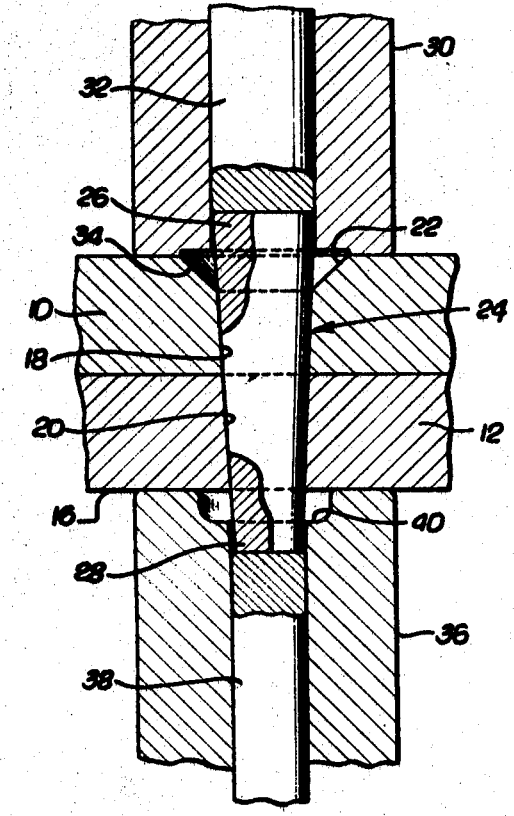
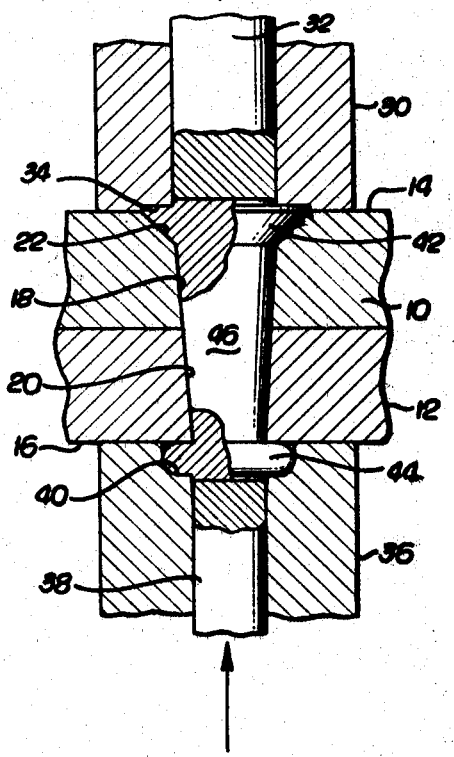
INVENTOR.
FRANKLIN S. BRILES
By Huebner & Worrel
ATTORNEYS.

July 9, 1968      F. S. BRILES      3,391,449
METHOD OF MAKING A PRESTRESSED RIVETED CONNECTION
Filed Jan. 17, 1966      2 Sheets-Sheet 2
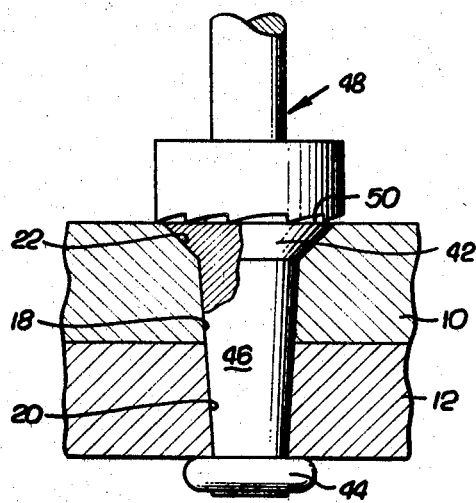
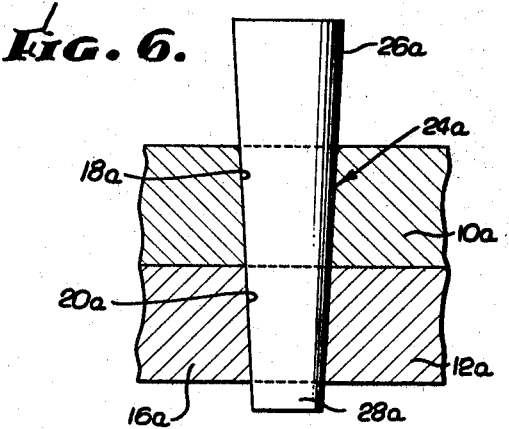
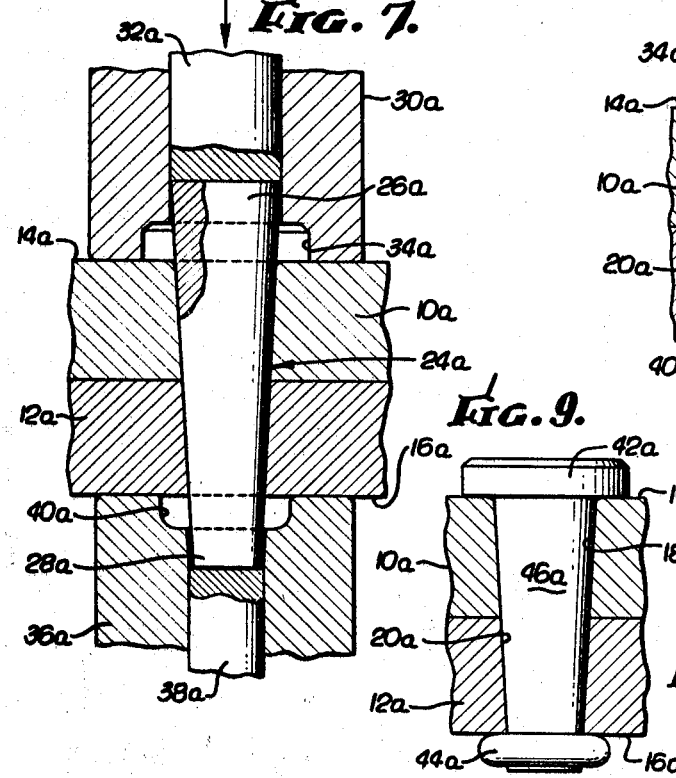
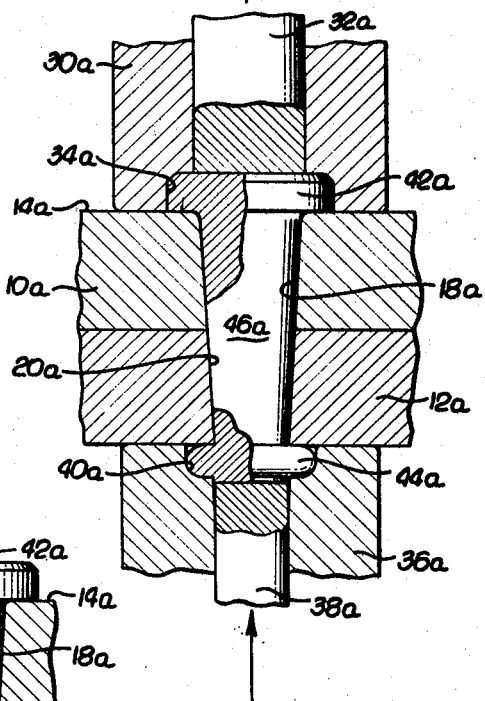
INVENTOR.
FRANKLIN S. BRILES
By Huebner & Worrel
ATTORNEYS.

3,391,449
METHOD OF MAKING A PRESTRESSED RIVETED CONNECTION
Franklin S. Briles, 6 Middleridge Lane,
Rolling Hills, Calif. 90274
Filed Jan. 17, 1966, Ser. No. 521,107
10 Claims. (Cl. 29—522)

ABSTRACT OF THE DISCLOSURE

A method of utilizing an unheaded, tapered rivet blank to provide a prestressed riveted connection, wherein the blank is inserted into a complementary tapered bore through structure being fastened until the blank seats in the bore, then the blank is moved a predetermined axial increment from this seated position toward the small end of the bore to establish a predetermined amount of interference prestressing between the blank and the structure immediately surrounding the bore, and the blank is then upset at both ends to clamp the structure and fix the rivet axially in the bore.

---

The present invention relates to the riveting art, and it relates more particularly to a novel method of establishing a riveted connection which is prestressed with an interference fit of controlled amplitude between the rivet shank and the wall of the rivet hole.

United States Letters Patent No. 3,034,611, issued May 15, 1962 to John Zenzic teaches the use of a tapered fastener engaged in a complementary tapered bore with a controlled amount of interference between the fastener and the wall of the bore to provide a structural joint which is prestressed, and which is therefore provided with increased strength and fatigue resistance. Tapered fasteners according to the Zenzic Patent No. 3,034,611 are now used extensively, particularly in the aircraft industry, to give increased strength and useful life to structural connections without any appreciable added weight. The Zenzic patent teaches that a predetermined amount of interference may be established by providing the tapered fastener shank with larger diameters than the corresponding diameters in the tapered bore, and limiting the axial extent of insertion of the shank into the bore at the point of desired interference by seating of a head on the fastener against the structure. While such determination of the amount of interference is the most practical to use in connection with fasteners such as bolts and rivets having integral heads preformed thereon, it fails to provide the necessary axial indexing for fasteners which do not have heads preformed thereon, such as headless rivet pins which are adapted to be upset at both ends during the riveting operation.

In some riveting operations it has been found most practical and economical to utilize such headless rivets, which are simply pins, and to effect the riveted joint by a sequence of first drilling the rivet hole, then inserting the headless rivet or pin into the hole so that it projects outwardly from both sides of the structure, and then upsetting both ends of the pin simultaneously. High speed automatic riveting equipment such as "Drive-Matic" riveters produced by General Electrical Mechanical Inc., of Buffalo, N.Y., are capable of providing uniform and reliable riveted joints with such unheaded rivets or pins at regular intervals along extended lengths of structures, as for example where external aircraft skins are attached to long, unitary stringers in aircraft wing construction. Such automatic riveters are particularly useful where the modulus of elasticity (Young's modulus) of the rivet material is in the same general range or is less than that of the structure, as for example where an aluminum rivet is applied to aluminum structure, or a titanium rivet is applied to titanium structure. Heretofore, such automatic riveting by the use of unheaded rivet blanks has involved the use of untapered blanks, and has not embodied the advantages of prestressing by use of tapered fasteners in accordance with the teachings of the Zenzic Patent No. 3,034,611.

It is accordingly an object of the present invention to provide a novel method of making a prestressed riveted connection wherein the controlled interference tapered fastener concept of the Zenzic Patent No. 3,034,611 is applied in connection with an unheaded rivet blank in the form of a tapered pin which is upset at both ends thereof during the riveting operation.

Another object of the present invention is to provide a novel method of effecting a controlled interference tapered fastener joint wherein the amount of interference between the tapered fastener and the wall of the bore in the structure is determined by the extent of axial insertion of the tapered fastener in the bore, but without reference to the positioning of a fastener head.

A further object of the present invention is to provide a novel method of producing a prestressed riveted joint wherein the interference between the rivet shank and the wall of the rivet bore in the structure can be accurately controlled even when the modulus of elasticity of the rivet approaches or is less than that of the structure.

A still further and more general object of the invention is to provide a novel fastening method of the character described which is particularly simple and economical, permitting utilization of simple unheaded rivet blanks, and which is adapted to currently existing automatic riveting equipment with only minor modifications therein.

Additional objects and advantages of the present invention will appear during the course of the following part of the specification, wherein the novel method steps and mode of operation of the invention are described with reference to the accompanying drawings, in which:

FIGURE 1 is a vertical section showing a pair of overlapping structural members, in the form of plates or sheets which are to be secured together according to the present invention, and which have been provided with a tapered bore therethrough.

FIGURE 2 is a view similar to FIGURE 1, with an unheaded, tapered rivet blank seated in the tapered bore of FIGURE 1, before the establishment of any substantial interference between the rivet blank and the wall of the bore.

FIGURE 3 is a view similar to FIGURE 1, with riveting dies engaged over the ends of the rivet blank, and with the rivet blank moved axially through the bore from the position of FIGURE 2 an extent sufficient to produce the predetermined amount of interference between the rivet blank and the wall of the bore.

FIGURE 4 is a vertical section similar to FIGURE 3, with portions in elevation, illustrating the upsetting of the ends of the rivet blank by using upsetting pins in the riveting dies.

FIGURE 5 is a vertical section with portions in elevation illustrating the spot facing of the head of the completed rivet to make it flush with the adjoining exposed surface of the structure.

FIGURE 6 is a view similar to FIGURE 2, but illustrating the insertion and seating of an unheaded, tapered rivet blank in a tapered bore as a step in the production of a prestressed rivet joint wherein the rivet that is produced is of the protruding head type instead of the tapered, countersink type produced in the sequence of FIGURES 1 to 5.

FIGURE 7 is a view similar to FIGURE 3, but illustrating the use of a modified upper die so as to produce the protruding type of rivet head.

FIGURE 8 is a view similar to FIGURE 4, illustrating the upsetting of the ends of the rivet blank of FIGURES 6 and 7.

FIGURE 9 is a vertical section, partly in elevation showing the completed prestressed rivet joint resulting from the sequence shown in FIGURES 6, 7 and 8.

FIGURES 1 to 5 illustrate the riveting together of a pair of plates or sheets 10 and 12, starting with an unheaded, tapered rivet blank or pin, in such a manner that the material of the plates 10 and 12 immediately surrounding the rivet in the completed joint is stressed to the predetermined extent. The plates 10 and 12 are in overlapping or stacked relationship, resulting in exposed surfaces 14 and 16 of the respective plates 10 and 12. Plates 10 and 12 are provided with a tapered bore extending through both plates, the bore being defined by frusto-conical surfaces 18 and 20 in the respective plates 10 and 12. Countersink 22 is provided in plate 10.

The rivet blank is generally designated by the reference numeral 24, and comprises an unheaded pin having a large diameter end 26 and a small diameter end 28, the blank 24 having the same rate of taper as the bore that is defined by the surfaces 18 and 20.

FIGURE 2 illustrates the rivet blank 24 inserted into the tapered bore until it is seated in metal-to-metal contact with the surfaces 18 and 20 of the bore, but before any substantial compressive engagement or interference has been achieved. From the seated position of FIGURE 2, any further axial movement of the blank 24 toward the small diameter end of the bore will result in the establishment of interference between the tapered rivet blank 24 and the wall of the bore. The amount of prestressing interference which is established will be determined by the rate of taper of the blank and bore, and by the extent of the axial movement.

The rate of taper of the rivet blank, and accordingly also of the frusto-conical surfaces 18 and 20, is preferably in the range of from about .125 to about .375 inch per foot, with the preferred amount of taper being about .250 inch per foot, including the incline at both sides. The preferred amount of interference that is to be established between the rivet blank 24 and the surfaces 18 and 20 defining the bore will be in the range of from about .006 inch of interference per inch of rivet shank diameter to about .048 inch of interference per inch of rivet shank diameter. As a practical matter rivets prepared according to the present invention will normally have a shank diameter in the range of from about 1/8 inch to about 1 inch, although the invention is not necessarily limited to such range of diameters.

Assuming a rate of taper of .250 inch per foot of axial length, the desired interference range of from about .006 to about .048 inch of interference per inch of rivet diameter will be produced by axial movement of the blank 24 in the bore from its seated, unstressed position of FIGURE 2 of from about .288 to about 2.304 inches axial movement per inch of rivet diameter.

With the minimum rate of taper of about .125 inch per foot of axial length said desired interference range will be produced by axial movement from the position of FIGURE 2 of from about .576 to about 4.608 inches axial movement per inch of rivet diameter.

On the other hand, with the maximum rate of taper of about .375 inch per foot, said desired interference range will be produced by axial movement from the position of FIGURE 2 of from about .192 to about 1.536 inches axial movement per inch of rivet diameter.

Accordingly, the overall range of axial shifting of the rivet blank 24 toward the small end of the bore from the seated position of FIGURE 2 will preferably be from about .192 inch per inch of rivet diameter to about 4.608 inches per inch of rivet diameter.

In FIGURE 3 the rivet blank 24 has been axially shifted toward the small end of the bore from the position of FIGURE 2 in order to establish the desired amount of interference. This axial movement of the blank 24 has been accomplished by an upper die means comprising a tubular outer die portion 30 and an inner die pin or plunger 32.

The outer die portion 30 is brought down into engagement against the exposed, upper face 14 of the panel 10, with the large end portion 26 of the blank 24 projecting upwardly into the hollow central portion of the die part 30. The pin or plunger portion 32 of the die means is engaged against the large end of the blank 24 and moves axially to provide the desired amount of axial movement of the blank 24 relative to the plates or panels 10 and 12 so as to establish the desired amount of interference. The outer die member 30 may, if desired, have a head cavity 34 which will result in a slightly raised portion of the rivet head above the surface 14 of the plate 10.

A lower die means has a tubular outer portion 36 which is brought into engagement against the downwardly facing, exposed surface 16 of the plate 12, and includes a pin or plunger 38 which is slidable within the portion 36 of the lower die means for upsetting the small diameter end portion of the blank 24. The tubular die part 36 is provided with a suitable upset cavity 40 which provides room for and controls the shape of the upset that is produced on the small diameter end portion of the rivet blank.

Preferably the upper and lower die means will operate with the following sequence: The tubular die members 30 and 36 will be brought against the respective surfaces 14 and 16. Then, the plunger 32 of the upper die means will shift downwardly relative to the die portion 30 and relative to the plates 10 and 12 so as to axially move the rivet blank 24 to the desired interference position, which is the position illustrated in FIGURE 3. Then, there will be a simultaneous compressive movement of the plungers 32 and 38 so as to upset both ends of the rivet blank simultaneously. The upsetting movements of the plungers 32 and 38 may commence with a compressive type of movement, and then a vibratory movement for the final part of the upsetting, or may comprise a series of impacting blows by these plungers.

Alternatively, the primary movement to achieve the upsetting may be provided by the upper plunger 32, with the lower plunger 38 either having only a restricted amount of movement or being a rigid part of the lower die means. In such a case, the axial movement of the rivet blank 24 from the position of FIGURE 2 to that of FIGURE 3 may be accomplished, at least in part, simultaneously with the upsetting movement that is applied by the upper plunger 32.

The extent of axial shifting of the blank 24 from the initial seated position of FIGURE 2 to the final axial position illustrated in FIGURE 3 wherein the desired amount of interference has been established may be indexed in several different ways. One way is to sense when the tapered blank 24 bottoms or seats in the tapered bore defined by surfaces 18 and 20 at the position shown in FIGURE 2. Such sensing can be accomplished in automatic equipment if desired based upon the sudden increase in resistance to axial movement of the tapered blank 24. Then, the blank can be moved axially a further increment that is within the range set forth hereinabove. This can be accomplished in automatic machinery by employing a microswitch stop based upon the amount of axial movement of the blank 24 toward the small end of the bore from the position of metal-to-metal contact between the tapered blank 24 and the wall 18–20 of the bore. Alternatively, indexing of the correct amount of axial shifting of the blank from the position of FIGURE 2 to that of FIGURE 3 may be based upon the position of the large end 26 of the blank 24 relative to the surface 14 of the plate 10, this relative positioning being reflected by the relative axial positions of the portions 30 and 32 of the upper die means. Since the plates 10 and 12 will be held in a fixed position in automatic equipment for a riveting operation, the correct axial positioning of the blank 24 as illustrated in FIGURE 3 can be determined in such equipment by the position of the upsetting pin or plunger 32.

A further means for indexing the amount of axial shifting of the blank 24 from the position of FIGURE 2 to the position of FIGURE 3 is to utilize a fixed stop means engageable against the small end 28 of the blank 24. Such fixed stop means may be a fixed position of the pin or plunger 38 of the lower die means.

When both ends of the rivet blank are upset by the die plungers 32 and 38 the large end of the rivet will be shaped to conform with the cavity defined between countersink 22, the die head cavity 34 and the upsetting pin or plunger 32, thereby forming a tapered, countersink type of rivet head 42. The small end of the rivet blank will be upset into the lower die cavity 40 so as to provide the tail end upset portion 44 of the rivet. The rivet head 42 and upset tail 44 will provide the desired clamp-up force for securing the plates 10 and 12 together, while the compressive forces of the rivet shank 46 against the surfaces 18 and 20 defining the bore through the plates provides the desired preloading or prestressing in the region of the plates 10 and 12 surrounding the bore so as to increase the strength and fatigue resistance of the joint generally in accordance with the teachings of the Zenzic Patent No. 3,034,611.

While the rivet blank 24 illustrated in FIGURES 2 and 3 comprises a pin having a uniform surface taper between its ends, it is to be understood that in some circumstances, and particularly where the blank is comparatively soft, it may be desirable to cut the small end portion of the rivet blank down to a cylindrical shape for approximately the length thereof which protrudes downwardly beyond the surface 16 of the plate 12 in FIGURE 3. Such a generally cylindrical tail end portion of the rivet blank would provide a relatively abrupt step or break between this projecting end of the rivet blank and the tapered shank portion thereof, which tends to effect a more abrupt upsetting at the desired point.

In the event that the rivet is composed of a stronger or harder material than the plates 10 and 12, or either of the plates, the material of the plates may not be able to provide adequate resistance to uncontrolled expansion of the rivet shank in the bore through the plates, which may interfere with achieving the desired amount of interference prestressing between the rivet shank and the wall of the bore. In such at situation it may be desirable to employ interference control collar means at either or both ends of the rivet in accordance with the teachings of co-pending application, Ser. No. 510,759, filed Dec. 1, 1965, by William Matievich for Rivet Having Interference Control Collar. In this manner the connection can be ensured against such uncontrolled expansion as might result in stress-corrosion cracking in the joint. It is preferred in the provision of riveted joints according to the present invention to control the amount of prestressing so that the elastic limit of the material surrounding the rivet hole is not exceeded to any great extent.

Where the rivet blank is composed of a material which is not a great deal harder than the material of the structure secured by the rivet, and particularly where the modulus of elasticity (Young's modulus) of the rivet blank approaches or is less than that of the parts which are being joined, some extrusion is likely to occur when the blank 24 is axially moved from the position of FIGURE 2 to the position of FIGURE 3, which results in a reduction of the amount of prestressing for a given amount of axial movement of the blank in the bore. For example, where the modulus of elasticity of the rivet blank is the same as that of the structure, deformation of the rivet blank will be so extensive during the axial movement as to require approximately twice the axial movement to secure the desired interference compression than would be the case if the rivet blank were much harder than the structure. The approximate extent of this additional axial movement for optimum interference can readily be determined according to the relative moduli of elasticity of the rivet blank and the structure, and if automatic riveting equipment is being used the axial movement can be indexed accordingly.

Since it is contemplated that the present invention will in some instances be employed in connection with automatic riveting equipment wherein it is common to utilize rivet blanks having a modulus of elasticity approaching that of the structure being riveted, the preferred ranges set forth hereinabove for axial movement of the blank to establish the desired interference include sufficient latitude to cover the additional axial movement necessitated by the extrusion likely to occur in the rivet blank.

The riveting operation illustrated in FIGURES 1 to 4 leaves a small portion of the rivet head projecting upwardly from the surface 14 of the plate 10. This can be cut down as generally illustrated in FIGURE 5 by means of a spot facer 48 or other suitable end mill type of tool so that the finished surface 50 of the rivet head 42 is flush with the surface 14. Alternatively, the head cavity 34 can be eliminated from the die member 30, and by proper sizing and indexing of the axial position of the rivet blank 24 the rivet head can be made to come out substantially flush with the surface 14 during the upsetting operation.

FIGURES 6 to 9 illustrate a riveting operation which is similar to that shown in FIGURES 1 to 4, with the exception that the rivet produced in the sequence of FIGURES 6 to 9 is of the type having a protruding head 42a, instead of the tapered or countersink type of head 42. Accordingly, plates 10a and 12a have a bore extending therethrough from surface 14a to surface 16a which is defined by internal surfaces 18a and 20a, but which does not contain a countersink for the head, since the protruding head 42a of the finished rivet is external of the bore. The initial rivet blank 24a is like the blank 24, having large and small ends 26a and 28a, respectively. However, the rivet blank 24a is somewhat longer than the blank 24 in order to provide the necessary extra metal on the finished rivet for the external head 42a.

The upsetting is accomplished with upper die means including a tubular die member 30a having a movable upsetting and indexing pin 32a, and having a relatively large head cavity 34a for accommodating and defining the final rivet head 42a. The lower die means is similar to that illustrated in FIGURES 3 and 4, including tubular outer die member 36a and upsetting pin or plunger 38a, the outer die member 36a having upset cavity 40a therein. The rivet produced by the sequence of FIGURES 6 to 9 has protruding head and tail upsets 42a and 44a, respectively, which bear against the exposed surfaces 14a and 16a, respectively, of the plates so as to provide the necessary clamp-up force. The interference prestressing between the shank portion 46a of the rivet and the wall of the bore will extend over substantially the entire length of the bore.

While the instant invention has been shown and described herein in what are conceived to be the most practical and preferred embodiments, it is recognized that departures may be made therefrom within the scope of the invention, which is therefore not to be limited to the details disclosed herein, but is to be accorded the full scope of the claims.

I claim:

1. The method of applying a riveted connection to structure which comprises the steps of providing a tapered bore which extends through the structure between opposite sides thereof, inserting a tapered rivet blank having substantially the same rate of taper as the bore into said tapered bore small end first from the large end of the bore until the tapered blank seats in the tapered bore, the blank being materially longer than the axial extent of the tapered bore with at least the large end of the blank projecting axially beyond the confines of the bore when the blank is thus seated in the bore, moving the blank a predetermined axial increment from said seated position toward the small end of the bore so as to establish a predetermined amount of interference prestressing between the blank and the material of the structure immediately surrounding the bore, both ends of the blank being exposed beyond the confines of the bore in the latter position of the blank, and upsetting both ends of the blank to form the blank into a rivet with head and tail enlargements thereon which bear against the opposite sides of the structure to provide clamp-up force on the structure and to fix the rivet axially in the bore to maintain said predetermined amount of interference.

2. The method of claim 1, wherein said axial increment of movement of the blank is provided by pushing against the large end of the blank to move the blank a predetermined distance from said seated position toward the small end of the bore.

3. The method of claim 2, which includes performing said pushing by die means which is employed to perform said upsetting of the large end of the blank.

4. The method of claim 3, which includes engaging the small end of the blank and performing said upsetting thereof by second die means located adjacent said structure in the region of the small end of the bore.

5. The method of claim 2, which includes indexing said predetermined axial increment of movement of the blank in the bore at least in part by comparing the axial position of the means used to perform said pushing relative to the position of said structure.

6. The method of claim 1, wherein said axial increment of movement of the blank in the bore is indexed at least in part by sensing an increase in resistance to further axial movement of the blank when the blank becomes seated in the bore as it is being inserted into the bore, and then moving the blank a further axial distance in the bore corresponding to said increment.

7. The method of claim 1, which includes indexing said predetermined axial increment of movement of the blank in the bore at least in part by stopping the small end of the blank at a predetermined spacing thereof from the side of said structure in the region of the small end of the bore.

8. The method of claim 7, which includes performing said indexing by die means which is employed to perform said upsetting of the small end of the blank.

9. The method of claim 1 wherein said predetermined axial increment of movement of the blank is in the range of from about .192 inch per inch of rivet diameter to about 4.608 inches per inch of rivet diameter.

10. The method of claim 1, wherein the amount of interference established between the rivet blank and the wall of the bore is in the range of from about .006 inch of interference per inch of rivet shank diameter to about .048 inch of interference per inch of rivet shank diameter.

References Cited

UNITED STATES PATENTS

| 3,034,611 | 5/1962 | Zenzic | 29—525 X |
| 3,270,410 | 9/1966 | Salter et al. | 29—446 |
| 3,304,109 | 2/1967 | Schuster | 29—525 X |

FOREIGN PATENTS

| 468,115 | 6/1937 | Great Britain. |

CHARLIE T. MOON, *Primary Examiner.*